April 4, 1950  A. R. MORRILL  2,502,629
MACHINE FOR MAKING STITCHDOWN SHOES
Filed Oct. 28, 1946  14 Sheets-Sheet 1
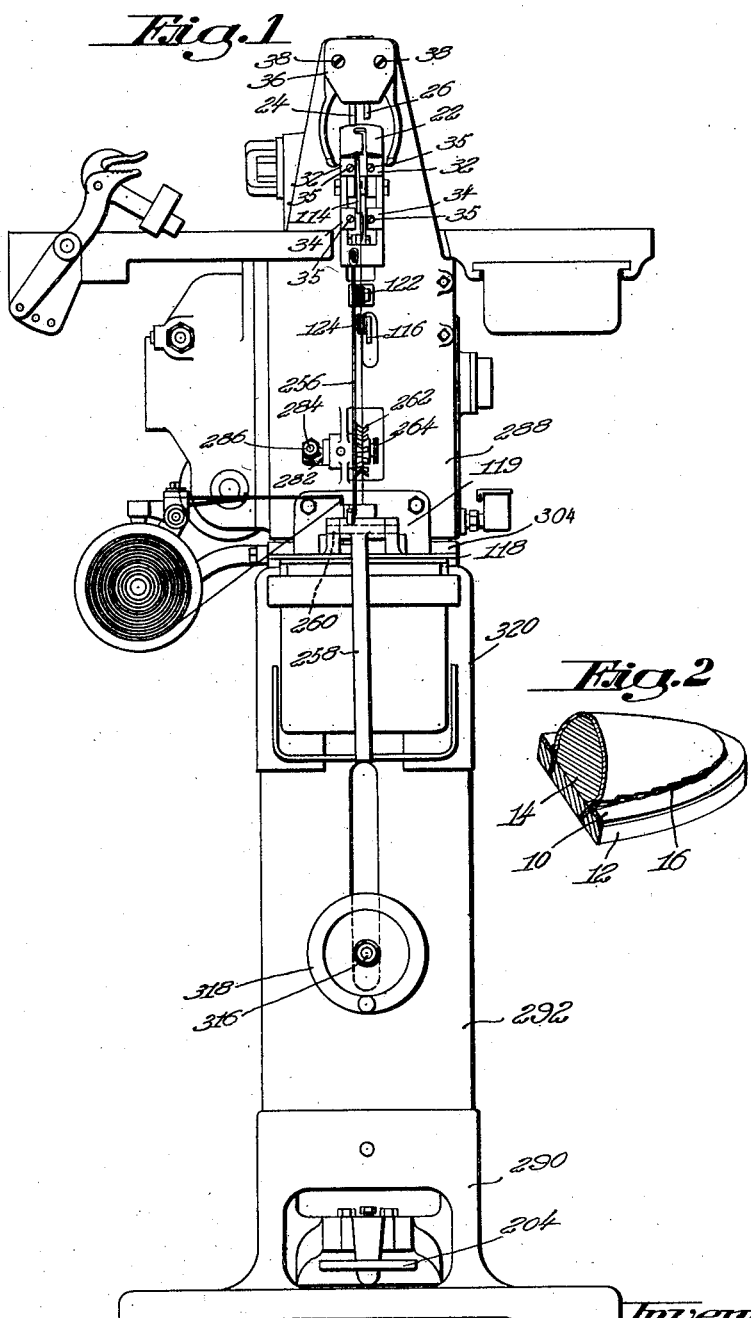
Inventor
ALFRED R. MORRILL, DECEASED
RUTH W. MORRILL, ADMINISTRATRIX
BY HER ATTORNEY

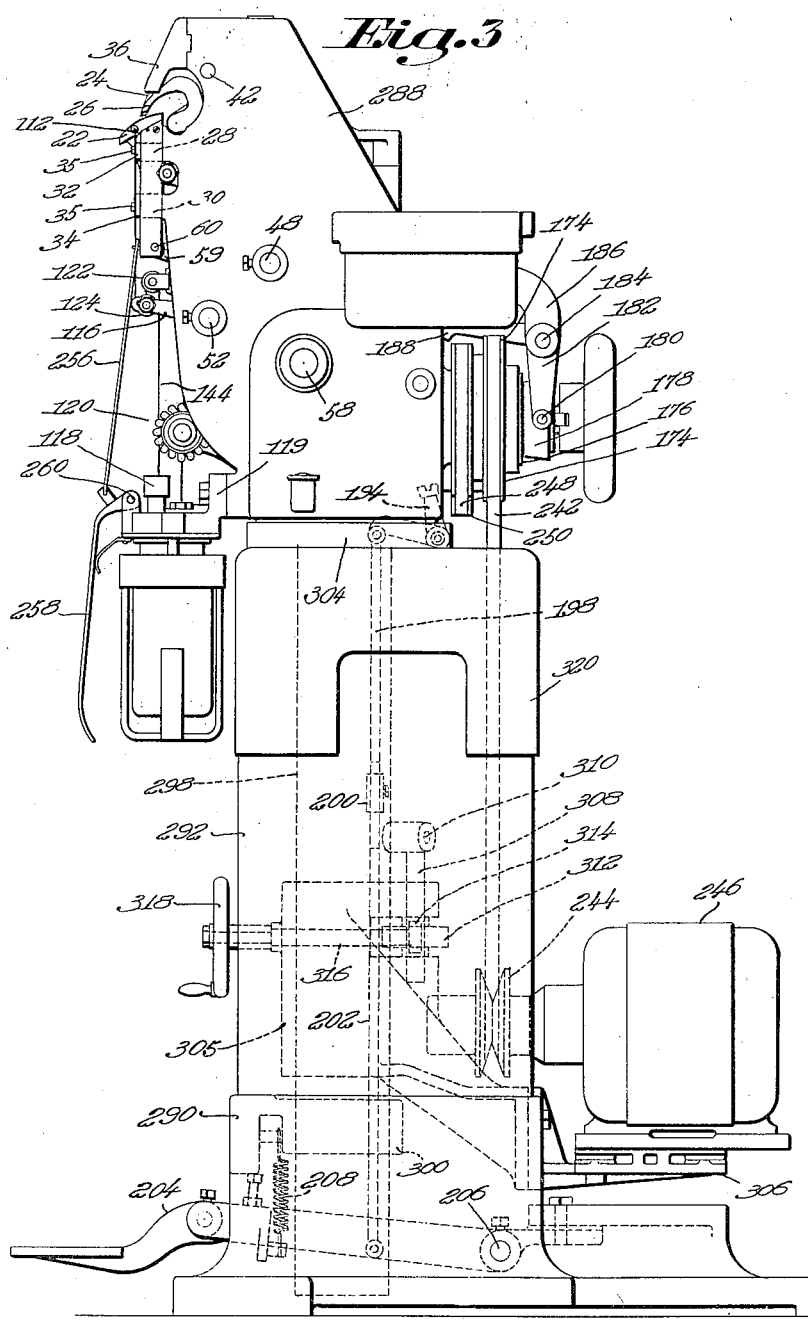

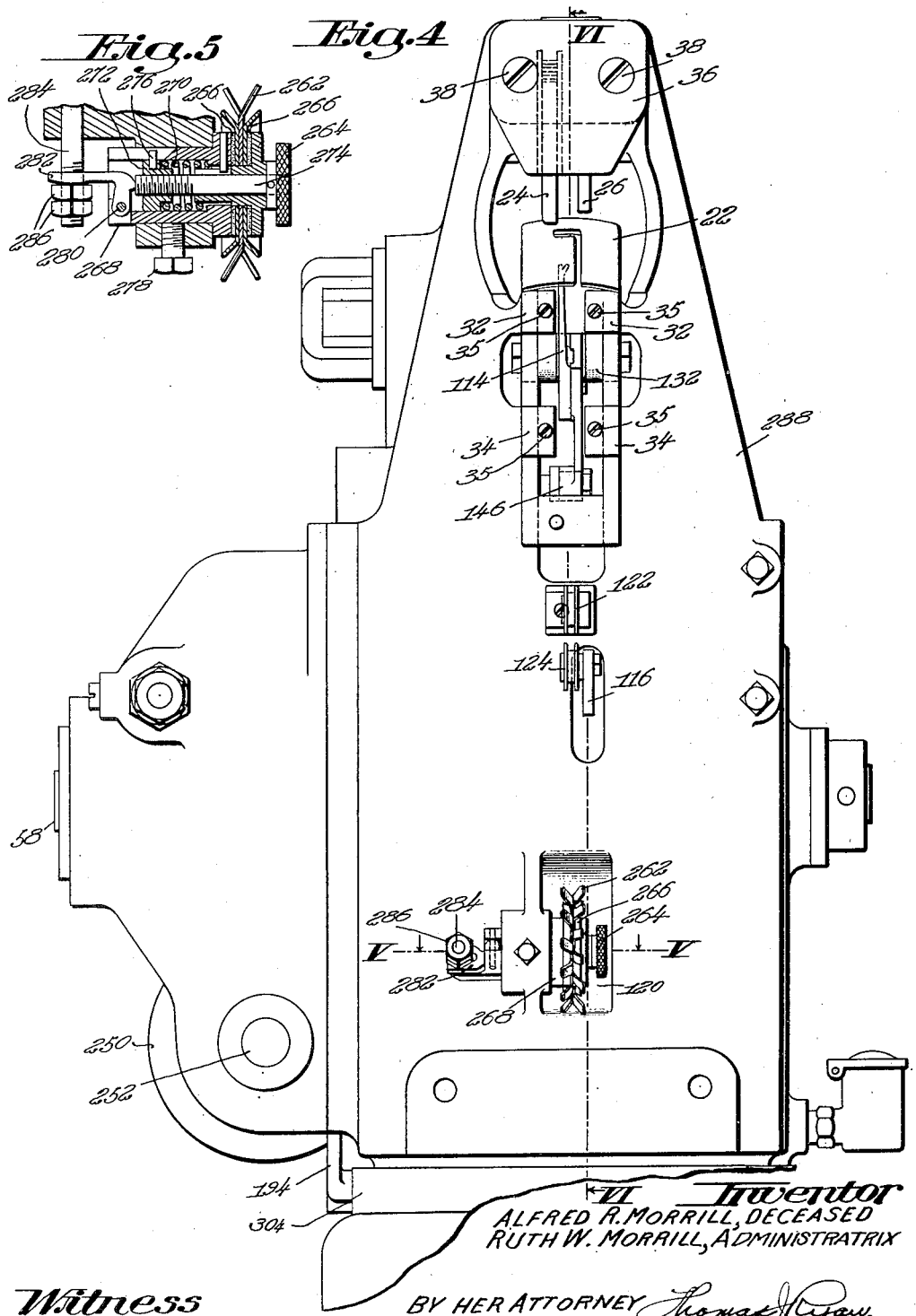

Inventor
ALFRED R. MORRILL, DECEASED
RUTH W. MORRILL, ADMINISTRATRIX
BY HER ATTORNEY

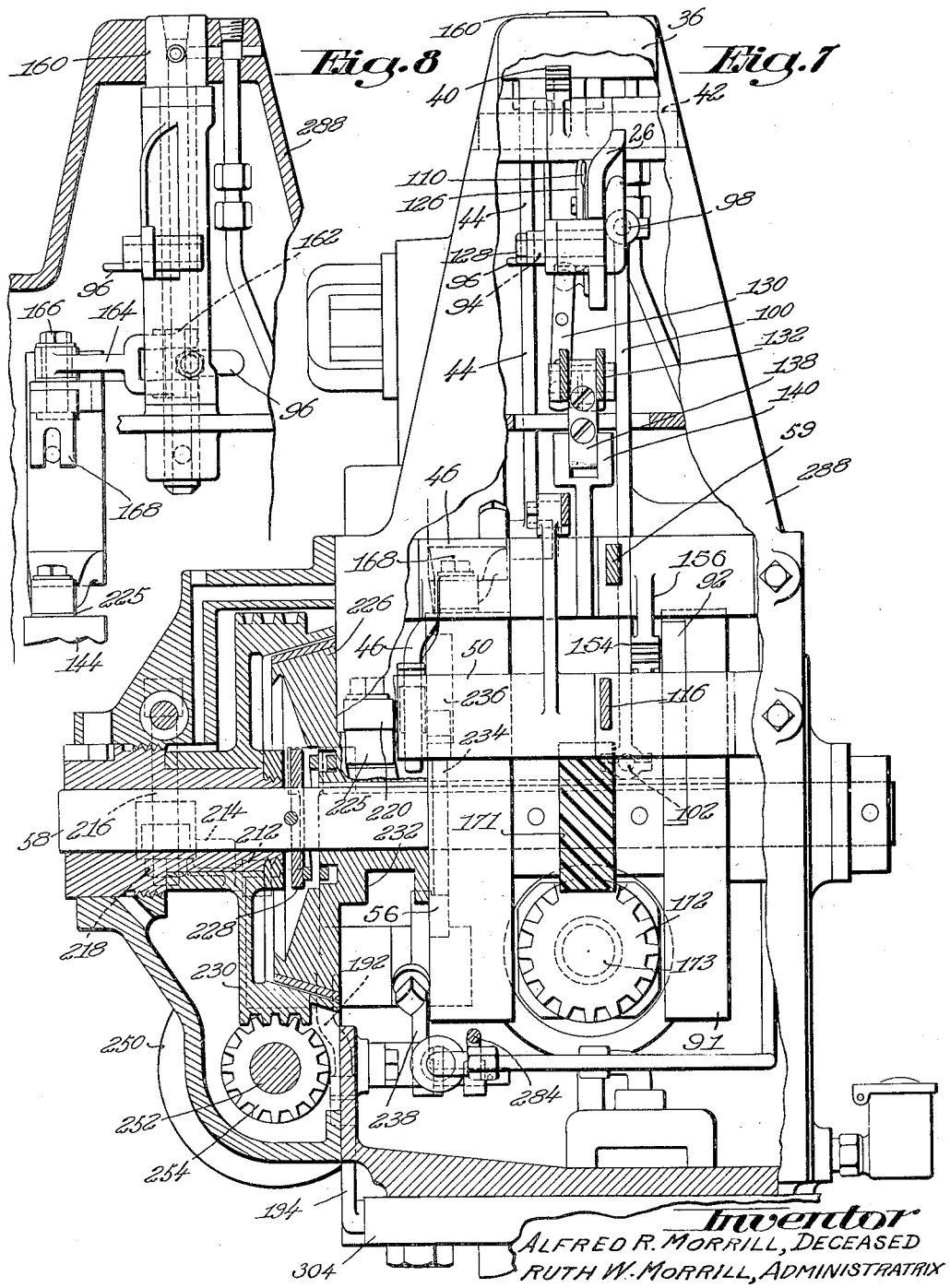

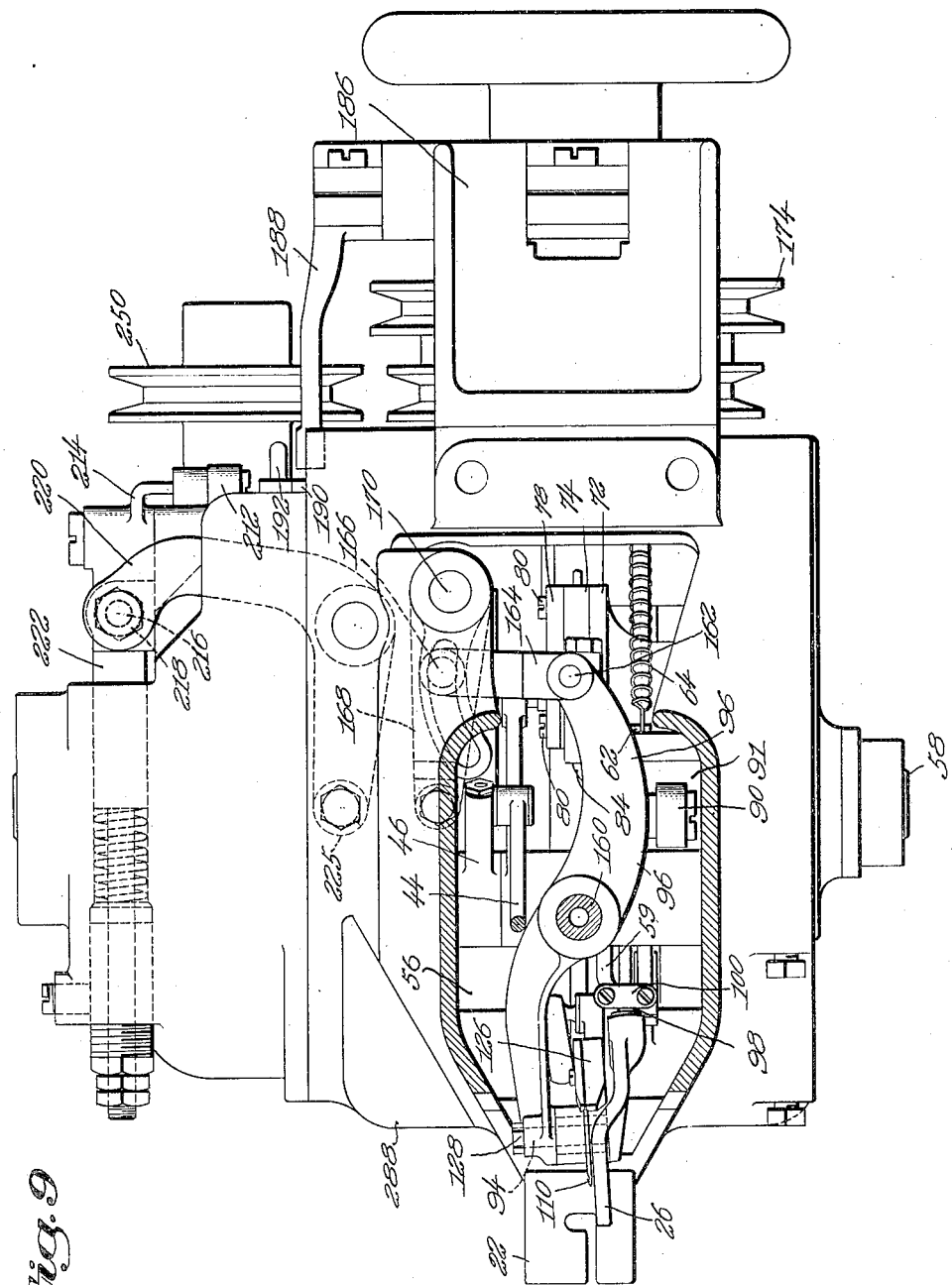

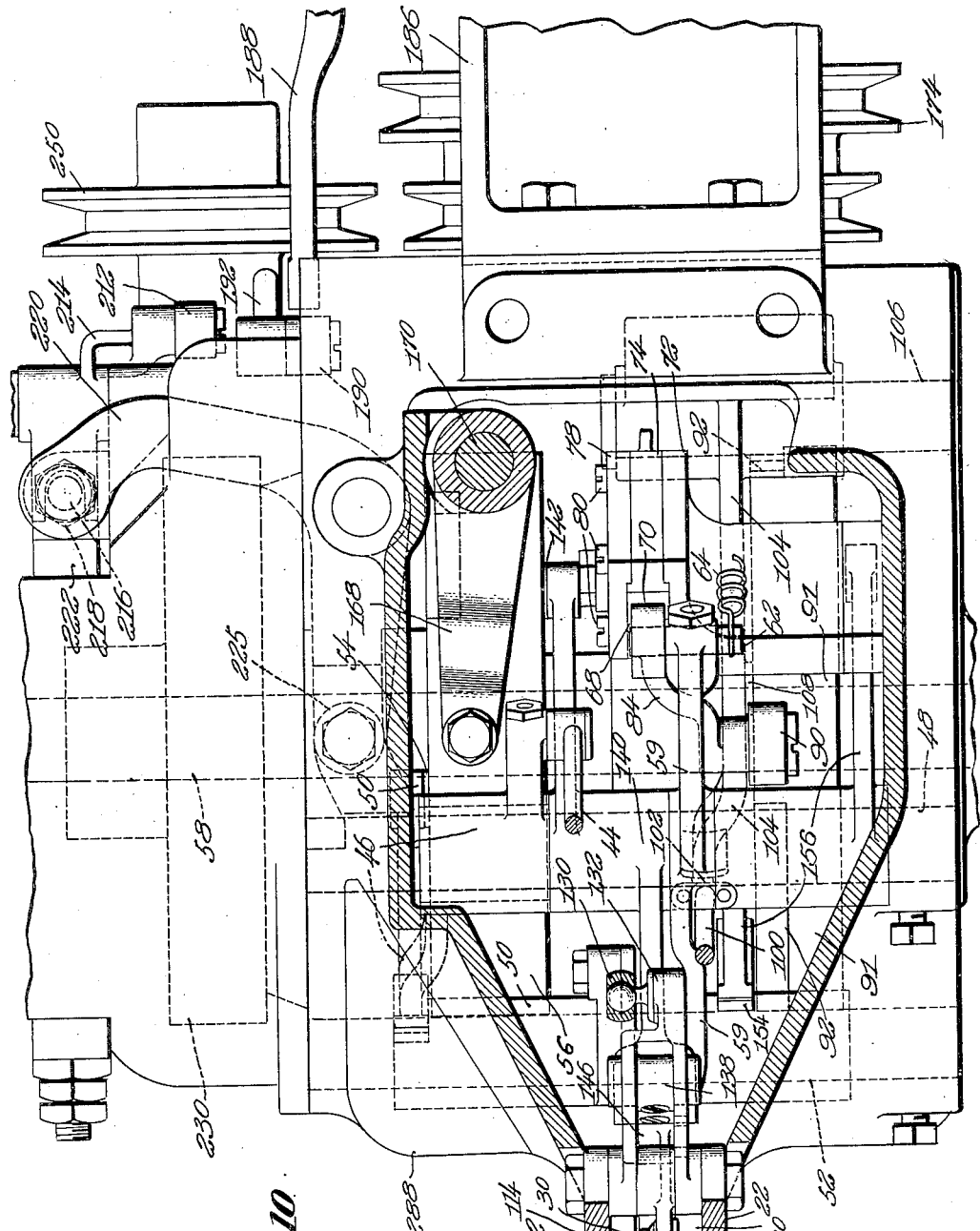

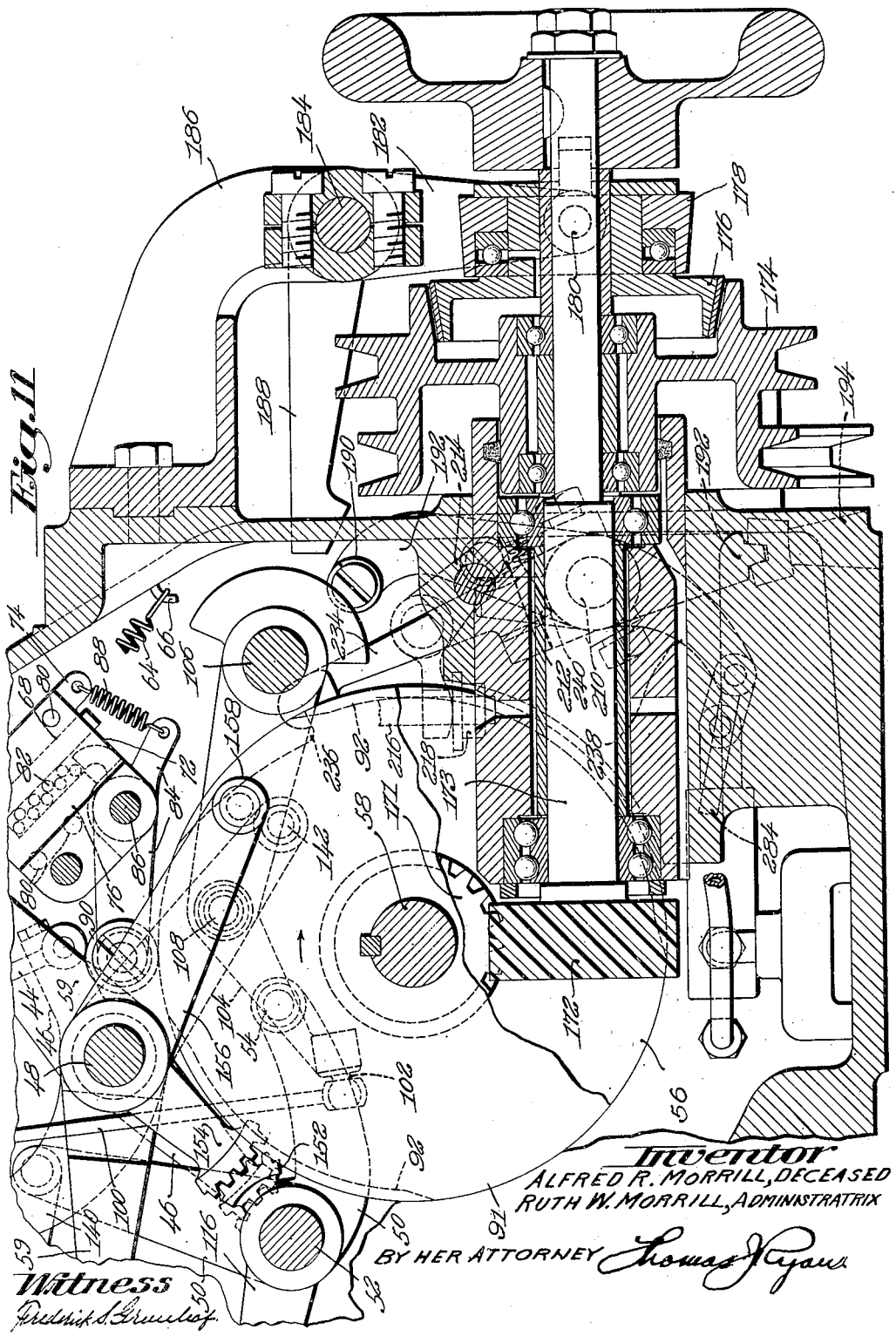

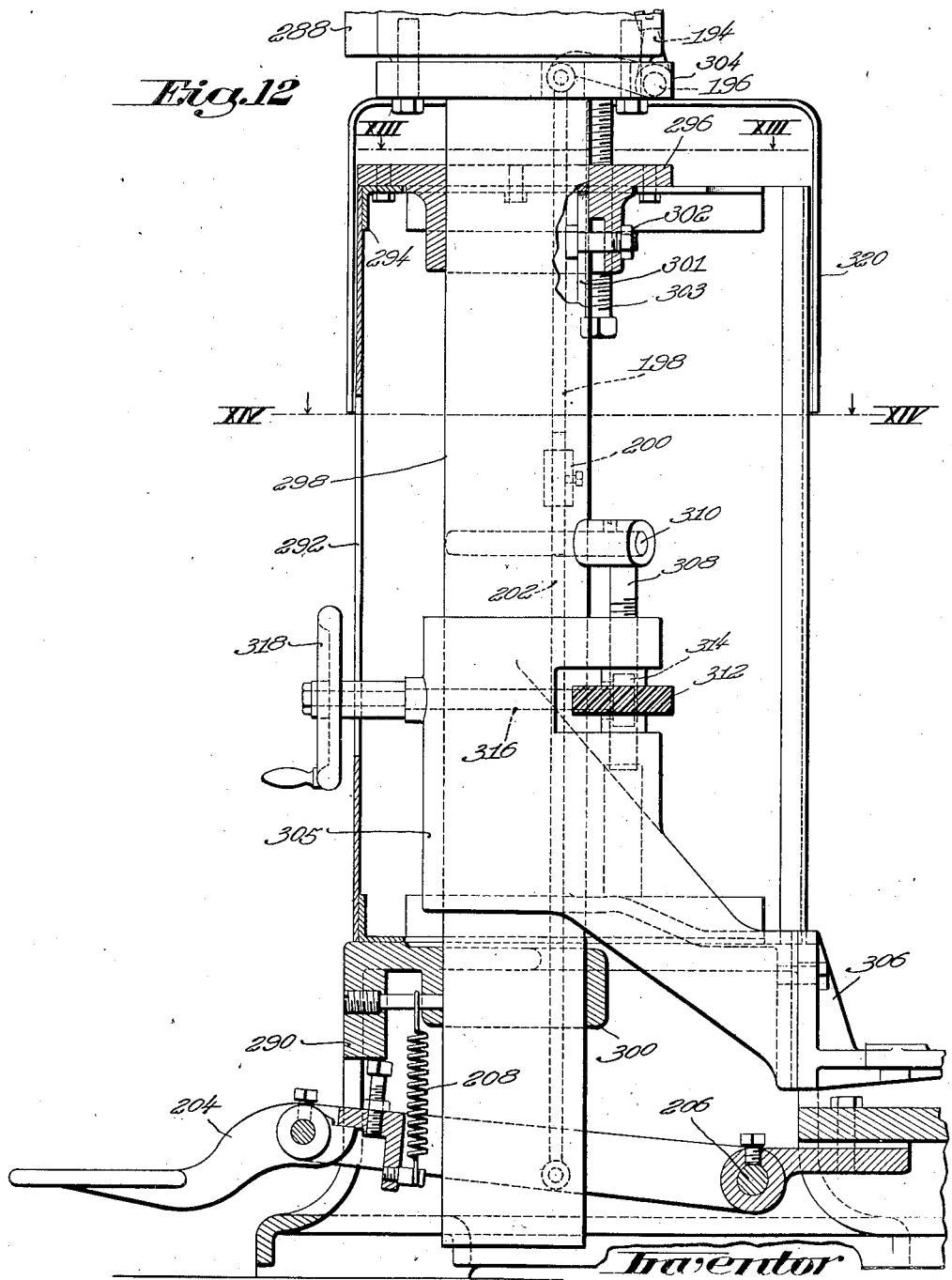

April 4, 1950 A. R. MORRILL 2,502,629
MACHINE FOR MAKING STITCHDOWN SHOES
Filed Oct. 28, 1946 14 Sheets-Sheet 10
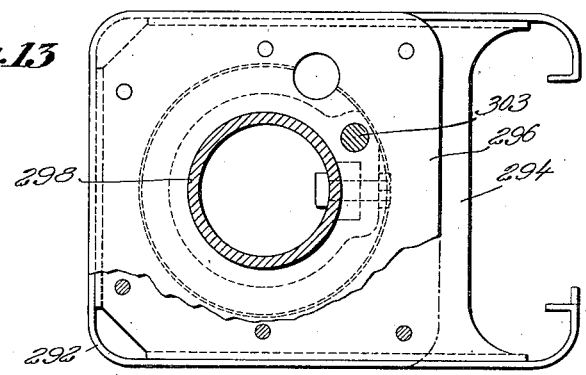
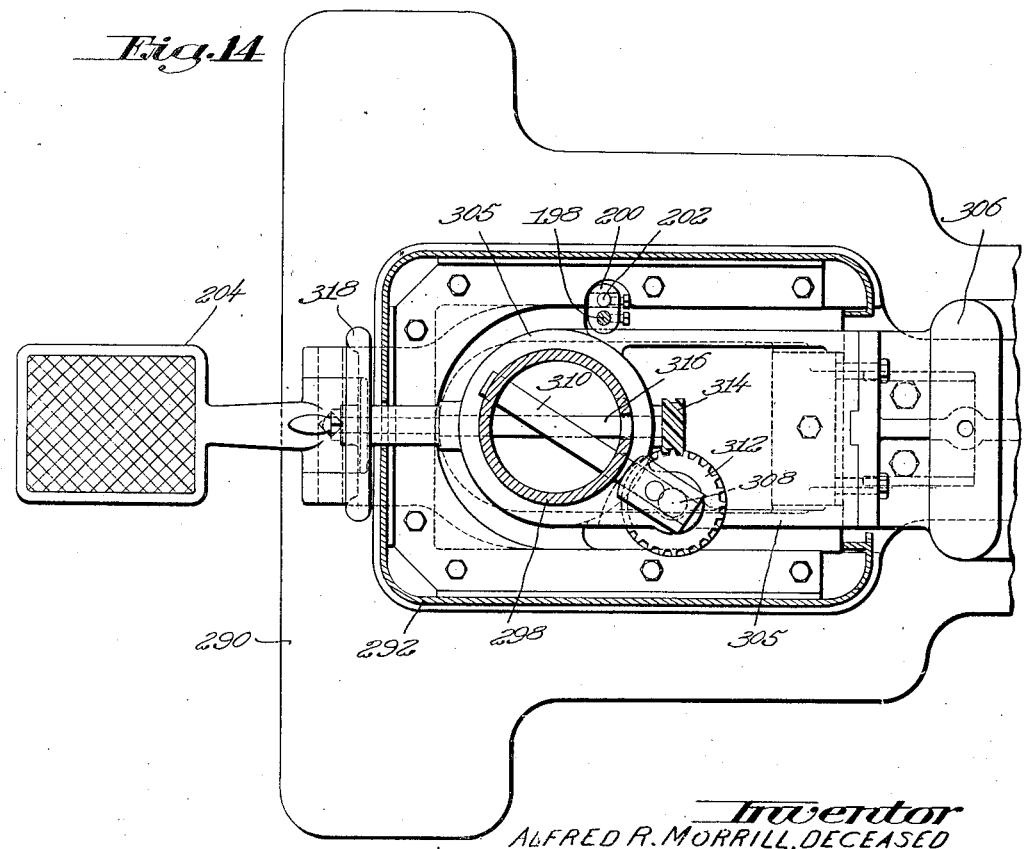
Inventor
ALFRED R. MORRILL, DECEASED
RUTH W. MORRILL, ADMINISTRATRIX
BY HER ATTORNEY Thomas J Ryan
Witness
Frederick S. Greenleaf

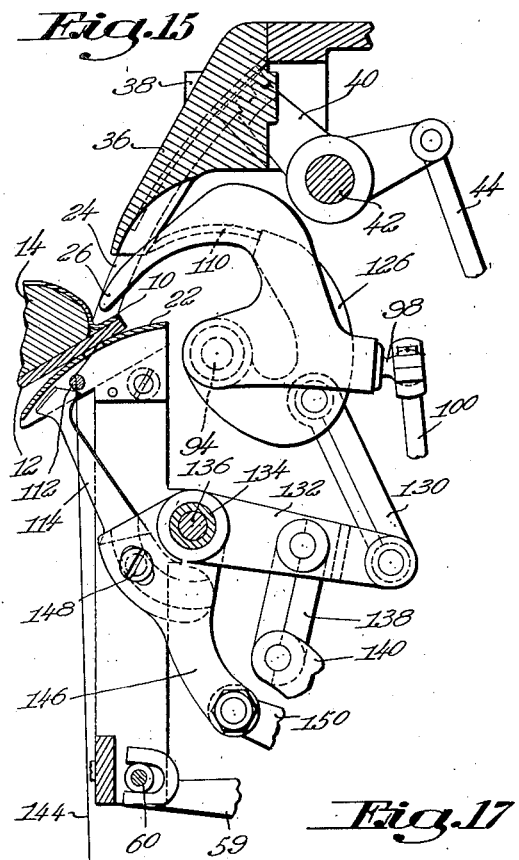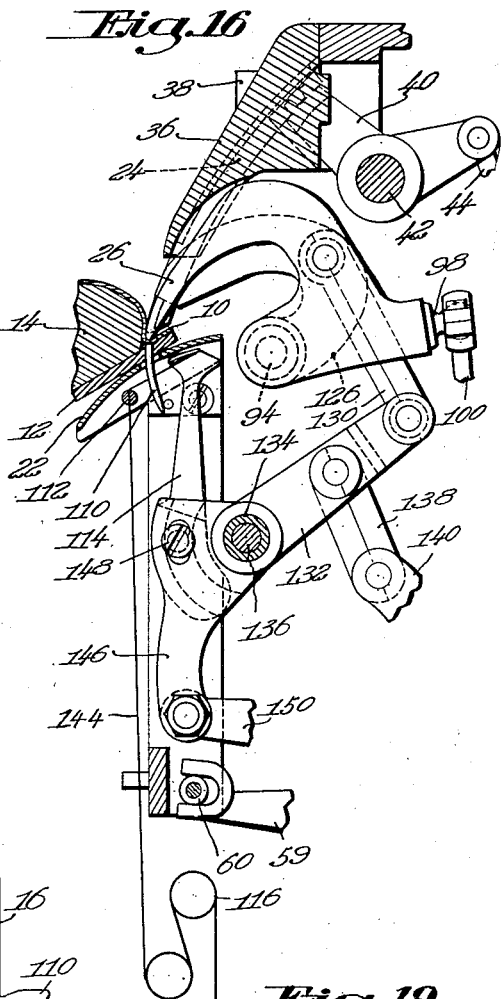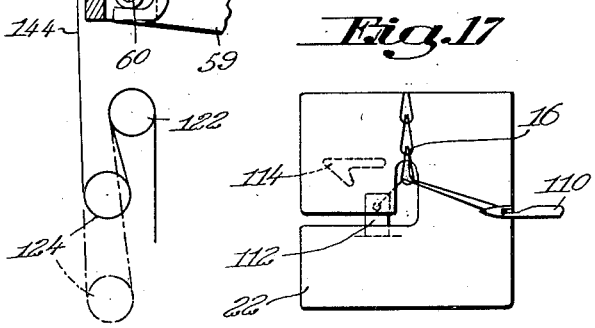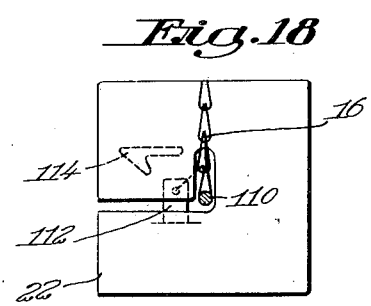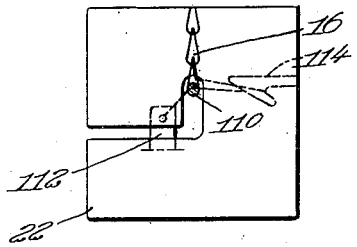

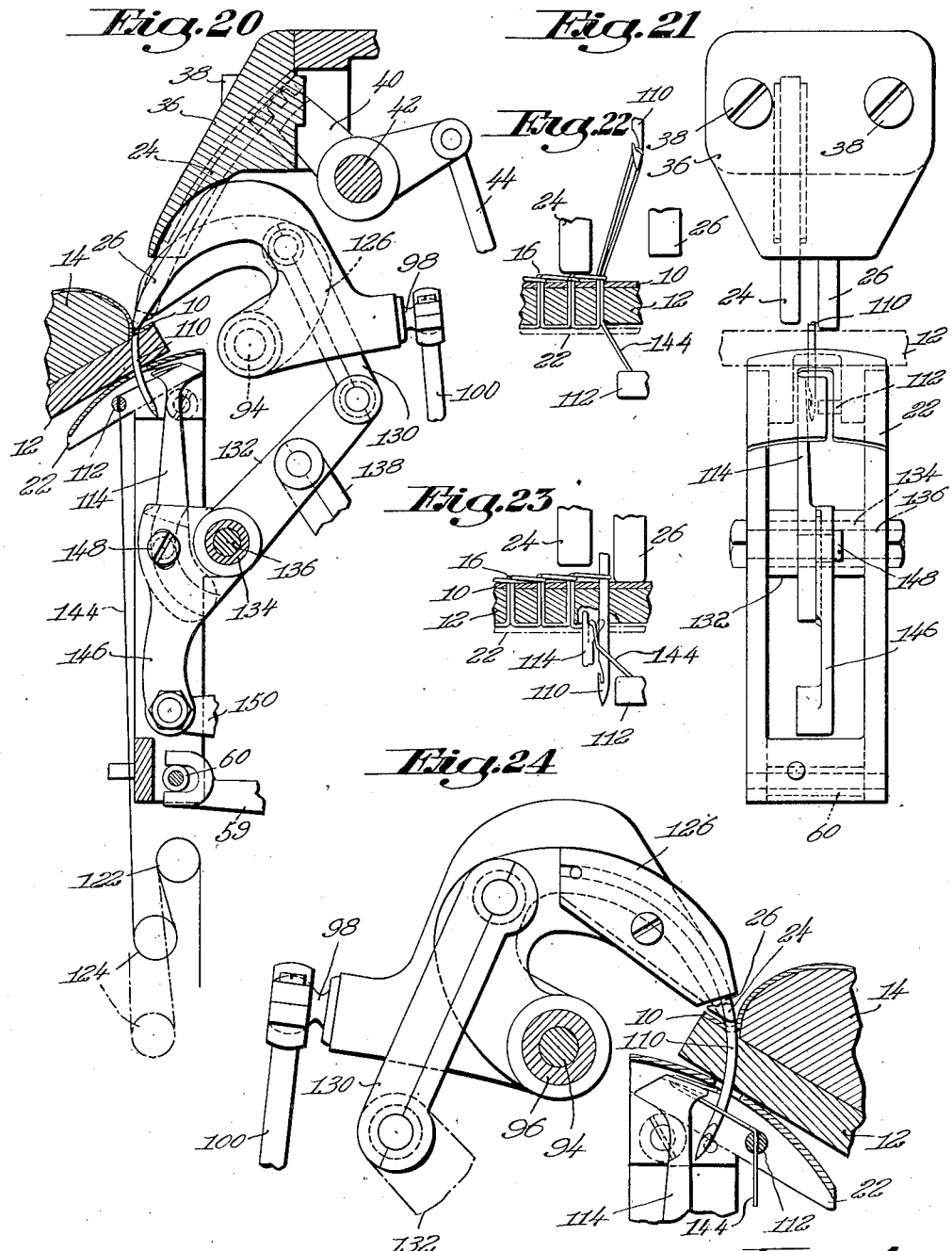

April 4, 1950  A. R. MORRILL  2,502,629
MACHINE FOR MAKING STITCHDOWN SHOES
Filed Oct. 28, 1946  14 Sheets-Sheet 13
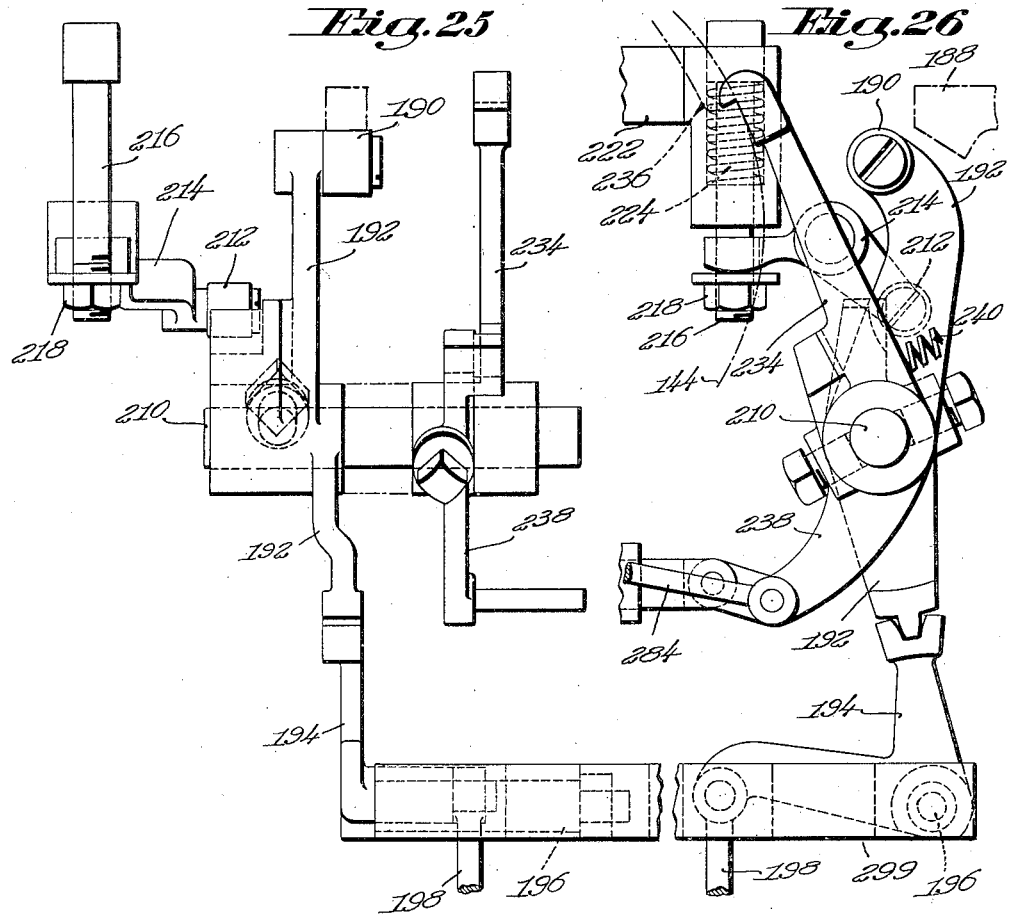
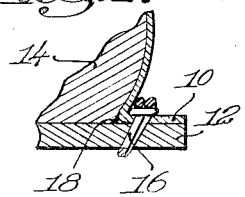
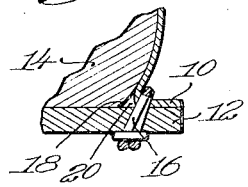
Inventor
ALFRED R. MORRILL, DECEASED
RUTH W. MORRILL, ADMINISTRATRIX
BY HER ATTORNEY Thomas Ryan
Witness
Frederick S. Greenleaf April 4, 1950          A. R. MORRILL          2,502,629
MACHINE FOR MAKING STITCHDOWN SHOES
Filed Oct. 28, 1946          14 Sheets-Sheet 14
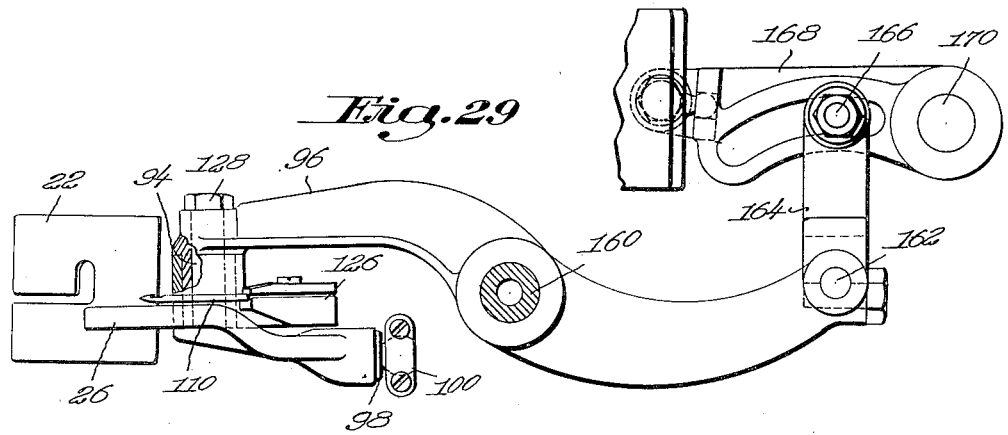
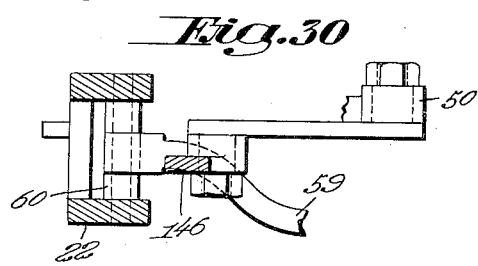
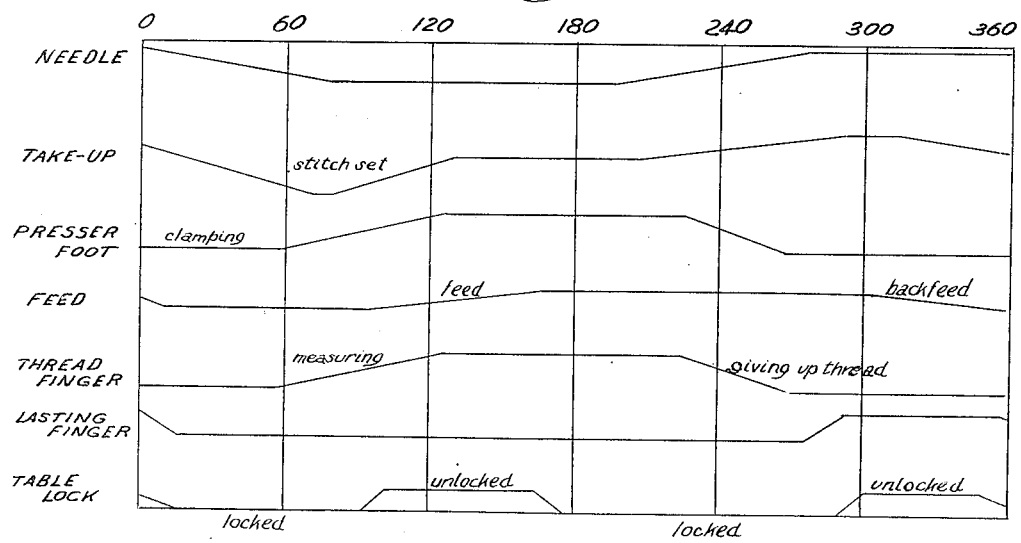
Inventor
ALFRED R. MORRILL, DECEASED
RUTH W. MORRILL, ADMINISTRATRIX
BY HER ATTORNEY Patented Apr. 4, 1950

2,502,629

UNITED STATES PATENT OFFICE 2,502,629

MACHINE FOR MAKING STITCHDOWN SHOES

Alfred R. Morrill, deceased, late of Woodstock, Vt., by Ruth W. Morrill, administratrix, Woodstock, Vt., assignor to United Shoe Machinery Corporation, Flemington, N. J., a corporation of New Jersey Application October 28, 1946, Serial No. 706,219

26 Claims. (Cl. 12—7.7)

The present invention relates to improvements in machines for lasting stitchdown shoes. As hereinafter shown and described the machine of the present invention is constructed to operate upon shoes of the type in which thread stitches are employed to draw an upper tightly over a last with its margin outturned and to secure it in lasted position.

An important object of the invention is to provide a simple and compact machine which will operate more effectively than prior machines while drawing the upper of a stitchdown shoe tightly over its supporting last and more securely within the angle between the side of the last and an extension sole mounted on the last than has been possible with previous use of similar machines. Another object is to improve the construction and arrangement of parts in a sewing machine which are particularly useful in thread-lasting the outturned upper of a stitchdown shoe to an extension sole, but which also are capable more generally of advantageous use in forming seams in other types of work. A further object of the invention is to enable the use of an especially rugged and inexpensive construction and arrangement of parts in a sewing or other machine of the class referred to both in its sewing mechanisms and in the support on which such machine is mounted particularly where it is desirable to adjust the height of the machine readily to the requirements of the operator.

In accordance with these and other objects the invention as herein disclosed consists of the features to be described and illustrated in the accompanying drawings which indicate one manner of carrying out the invention and the several embodiments of the invention which exemplify the varied aspects thereof as particularly defined in the appended claims.

In the drawings,

Fig. 1 is a view in front elevation of a machine embodying the invention;

Fig. 2 is a perspective view of the toe portion of a shoe sewed on the machine illustrated in Fig. 1;

Fig. 3 is a view in right side elevation of the machine of Fig. 1;

Fig. 4 is a view in front elevation, on an enlarged scale, of the sewing head of the machine;

Fig. 5 is a cross section on a further enlarged scale of the thread tension in the machine as viewed along the line V—V of Fig. 4;

Fig. 7 is a front view of the sewing head in the machine, partly broken away and shown in section, to illustrate the construction;

Fig. 8 is a front view taken in vertical section of the upper portion of the sewing head;

Fig. 9 is a sectional plan view of the sewing head, taken along the line IX—IX of Fig. 6;

Fig. 10 is a similar view on a further enlarged scale of the sewing head, taken along the line X—X of Fig. 6;

Fig. 11 is a side sectional view similar to that of Fig. 6 but on an enlarged scale of the lower portion of the sewing head and driving mechanism for the machine, partly broken away;

Fig. 12 is a side sectional view of the supporting column for the machine, looking from the right;

Fig. 13 is a horizontal section of the supporting column as viewed along the line XIII—XIII of Fig. 12;

Fig. 14 is another similar section as viewed along the line XIV—XIV of Fig. 12;

Fig. 15 is a sectional detail view, on an enlarged scale, looking from the right side of the machine, of the operating parts in the machine including the work support, the needle, thread finger and the connections for operating them, taken with the parts in stopping positions;

Fig. 16 is a similar view of the same parts, taken while the machine is operating on a shoe having a relatively thin sole;

Fig. 17 is a detail plan view of the parts about the sewing point in the same positions illustrated in Fig. 15;

Fig. 18 is a detail plan view of the same parts, showing their manner of operation upon a shoe during the formation of a stitch;

Fig. 19 is a detail plan view of the same parts with the position of the needle indicated after the work is fed in each sewing cycle;

Fig. 20 is a sectional view in side elevation of the parts illustrated in Fig. 16, taken while a stitch is being formed in relatively heavy work;

Fig. 21 is a front elevation of the work support, presser foot, lasting finger, thread finger, and needle, with the parts in the positions shown in Fig. 20;

Fig. 22 is a detail front view of the work support, thread finger and needle, illustrating the manner of clamping the shoe after work feed has taken place;

Fig. 23 is a detail front view of the work support, needle and thread finger of the machine, illustrating the manner of looping the thread about the needle;

Fig. 24 is a sectional detail view, on a somewhat enlarged scale, looking from the left, of the parts around the sewing point of the machine;

Fig. 25 is a detail view in front elevation of the principal connections in the stopping mechanism for the machine;

Fig. 26 is a view in right-side elevation of the stopping connections;

Figs. 27 and 28 are sectional views of portions of shoes sewed in the machine of the present invention and in a machine of the prior art, respectively;

Fig. 29 is a plan view of the work feeding connections on an enlarged scale;

Fig. 30 is a detail sectional view, on an enlarged scale, taken along the line XXX—XXX of Fig. 6; and Fig. 31 is a time chart, illustrating the relative movements of the operating parts of the machine.

Figure 6:
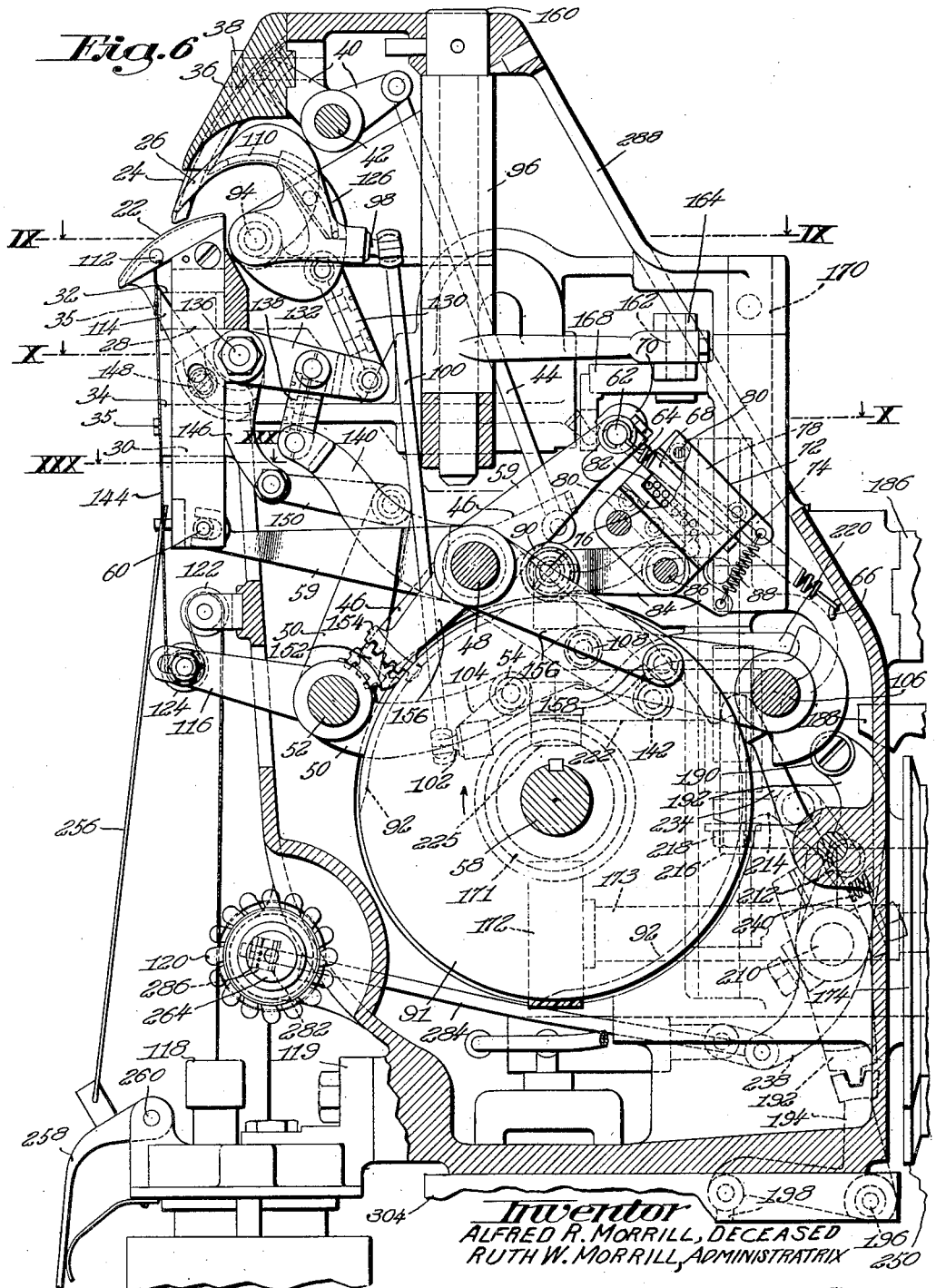
Fig. 6 is a vertical section of the sewing head of the machine, substantially as viewed along the line VI—VI of Fig. 4.

The lasting of stitchdown shoes as ordinarily practiced is a task requiring painstaking effort and unusual skill even with the use of modern equipment and machinery. When a lasting machine is employed, having sewing devices to secure together the parts of a shoe in lasted position, the sewing thread itself frequently is utilized to assist in the lasting operation, the stitches being formed successively and tensioned to draw the upper into close fitting conformity about a last. The shoe ordinarily is presented to the machine with the marginal portion of its upper, indicated at 10, roughly in outturned position overlapping the edge of an unchanneled extension sole 12. To give the upper its form, a last 14 is inserted previously between the upper and extension hole. Upon presenting the shoe to the machine, successive sections of the overlapping margins of the upper and sole are rigidly clamped to form a continuous flange, and a seam is inserted to secure the parts together. As the seam is inserted, the flange of the upper is drawn into an acute angle between the bulging side of the last and the extension of the sole. The seam is of the through-and-through type and is inserted as closely as possible to the bulging portion of the last without actually causing injury to the last supported portion of the upper. The through-and-through lengths of thread in the seam preferably are inclined outwardly within the substance from the bottom of the sole and curved in order to secure the upper against outward components of tension produced in the upper while stretching it over the last.

The machine illustrated as embodying the present invention is peculiarly adapted for the type of work referred to by the provision of clamping members acting to secure the outturned upper and extension sole of a stitchdown shoe in lasted relation and stitch forming devices of a novel and improved design. The stitch forming devices are constructed and operated to insert a chain-stitch seam fulfilling the requirements of effective thread lasting. Instead of inserting a chain-stitch seam in the usual way, however, with the chain portion of the seam engaging the sole 12 and the single thread portion of the seam engaging the flange of the upper 10, as shown in Fig. 28, the illustrated seam is inserted in the manner indicated in Figs. 2 and 27 with the chain portion of the seam engaging the flange of the upper and the single thread portion lying against the bottom surface of the sole.

By inserting a thread lasting seam in a stitchdown shoe comprising chain stitches with the chain engaging the upper according to the present invention, each loop of thread forming a stitch may be tightened against the upper with a tensional force exerted lengthwise of the seam in a direction which facilitates drawing the upper into close-fitting conformity with the last over which it is stretched. Furthermore, the chain of a chain-stitch seam, being composed of doubled thread, exerts a contracting force on the upper twice that of the single thread portion. Also, the chain of the seam exerts a compressional force against the upper over a wider area than the single thread portion, thus enabling the use of less expensive upper materials without subjecting such materials to the possibility of damage while drawing the upper within the angle between the last and the extension sole. With the single thread in the seam lying against the sole, a heavy tension may be applied to the stitch without cutting or otherwise injuring the sole by reason of its natural strength and rigidity as compared to the softer substance of the upper. Not only is a better securement of the upper obtained with such an arrangement of the seam but the double thread portion or chain in the seam actually presses the upper laterally into closer conformity with the last than would be possible with the same tension on the thread where a single thread only engages the upper, the width of the double thread tending to force the upper laterally into the angle between the last and the extension sole more deeply than is possible when the single thread of a seam engages the upper.

Referring to Fig. 27, a portion of a shoe is illustrated having its chain-stitch seam 16 inserted in the preferred manner with the chain engaging the upper. The chain, being composed of interlocked loops of thread, covers a strip on the upper of twice the width of a single thread. After inserting each stitch a given distance along the sole 12 from the bottom edge, indicated at 18, of the last, lateral pressure is applied when each stitch is tightened against the upper 10 in the direction of the last, forcing the upper into the crevice between the last and extension sole through a distance equal to the thickness of one of the threads. If the chain of the seam is laid against the bottom of the extension sole 12 according to prior practice with the single thread on the upper, as indicated in Fig. 28, lateral pressure applied to the upper by the single thread will be distributed along the upper over a strip the width of the single thread only and there will be less tendency to force the upper laterally toward the bottom edge 18 of the last and into the angle formed between the last and the sole. Thus, if the seam is spaced the same distance as in Fig. 27 from the edge 18 of the last with the single thread engaging the upper as in Fig. 28, there will be a triangular gap 20 the width of the thread between the surface of the last and the upper. Accordingly, in order to obtain the same results with the single thread engaging the upper, it will be necessary to insert the seam correspondingly more deeply within the angle between the last and the sole than when the chain of the seam engages the upper. If an attempt is made with the single upper engaging thread to offset this advantage by thus inserting the seam closer to the edge of the last there arises a danger of injuring the last supported surface of the upper during sewing by contact with the needle or with others of the stitch forming devices.

In some prior instances the advantages of utilizing the chain in a chain-stitch seam to secure the upper in place have been obtained by bending the edge of the sole away from the last before the seam is inserted in order to avoid injury to the last supported surfaces of the upper during sewing. Such bending of the sole produces a seam guiding channel or rib so that the sewing operation is more in the nature of Goodyear inseaming. Thereafter, the bent sole must be straightened to bring the parts into proper relationship and to form an outturned flange in the upper. Such operations add to the expense of shoe construction and require a higher quality of materials and workmanship for the shoe than needed in a stitchdown shoe.

Shoes constructed by the machine of the present invention may employ a relatively inexpensive, unchanneled sole composed of such frangible substances as fiberboard or synthetic plastics, a through-and-through chain-stitch seam being inserted without the necessity of channeling or bending the sole to form a sewing rib or requiring any other special treatment or procedure. The use of the chain on the upper has not been found objectionable in other respects as when a finish welt is used to cover the seam inasmuch as the double thread of the chain is tightened directly against the outturned flange of the upper and lies in flattened relation within the angle between the outturned and bulging portions thereof. After tightening the seam in the usual way, therefore, the finish welt may be applied to protect and hide the lasting seam in the usual manner of stitchdown shoe construction.

In the machine illustrative of the present invention, each through-and-through chain-stitch of the seam 16 is inserted to connect the upper and sole of a stitchdown shoe alternately with a clamping operation. The seam is inserted with the through-and-through lengths of thread both inclined with respect to the bottom of the sole and curved outwardly within the substance of the sole from the bottom upwardly to maintain the upper securely against outward components of tension in the upper. To insert a seam with the through-and-through lengths of thread therein disposed in this manner, the machine to be described is equipped with a hook needle and other suitable cooperating stitch-forming devices.

The features of the invention exemplified in the illustrated machine include the clamping members, and the stitch-forming devices referred to, and also a supporting frame particularly useful for adjusting the height of the machine conveniently to the requirements of the operator and otherwise for providing a light, rigid construction of inexpensive form. The construction of the frame is such as to enable convenient factory assembly of the parts with a minimum use of heavy castings requiring complicated machining operations and with a maximum use of standard or readily obtainable pressed or rolled sheet metal forms.

The clamping members for securing together the outturned margin of the upper 10 and the edge of the extension sole 12 while inserting the seam comprise a work support 22, a presser foot 24, and a lasting finger 26, the latter two members of which are separately operable toward and from the work support. The work support 22 has its upper surface rounded with a sole engaging area projecting a substantial distance beyond the upper engaging area of the presser foot to insure presentation of the shoe with the sole at the proper angle to the horizontal. The upper surface of the work support is generally inclined to the path of the needle along that portion engaging the work upwardly from the front of the machine toward the rear and is formed with an open-framed shank slidably mounted within a vertical guideway provided by two pairs of lugs 28 and 30 projecting outwardly from the frame of the machine and having secured at their outer ends cap plates 32 and 34, respectively. The lugs 28 and 30 engage the inner surfaces of side flange portions of the work support slide. To secure the cap plates in place, they are perforated to receive screws 35 threaded into the lugs 28 and 30. The cap plates engage the outermost surfaces of the work support slide and retain its vertical alinement with the guideway formed thereby.

The presser foot 24 has an arcuate shape, best shown in Fig. 6, and oscillates toward and from the shoe in a fixed path and is guided by a curved passageway formed within a cover member 36 secured to the front of the machine frame by a pair of clamp screws 38. The upper end of the presser foot has a pair of transverse notches to receive correspondingly shaped teeth at the outer end of an arm of a lever 40 fulcrumed loosely on a horizontal shaft 42 mounted within the frame of the machine.

To actuate the presser foot toward and from the work support in clamping a shoe during sewing operations a rearwardly extending arm of the lever 40 is pivotally connected with the upper end of a link 44, the lower end of which is connected to one arm of a lever 46. The lever 46 swings loosely on a fulcrumed shaft 48 and has formed at its lowermost extremity a segment engaging teeth on the hub of a cam-actuated lever 50 rotatable on a shaft 52. The cam lever 50 has a follower 54 engaging a groove in the left side of a cam 56 keyed to a main sewing shaft 58 (see Figs. 7 and 10). The movements imparted to the presser foot by this mechanism are such that the shoe is held clamped in position during the work penetrating and retracting strokes of the needle. While the shoe is being fed the length of a stitch, the presser foot is raised to free the work from clamping engagement with the work support. During feeding movement of the shoe, the work support also is yieldingly pressed into engagement with the bottom surface of the shoe so that the parts of the shoe are urged together during the relative feeding movement between the shoe and the clamping members.

The connections for pressing the work support yieldingly against the bottom surface of the shoe include a forwardly directed slotted arm of a lever 59 mounted for rotary movement on the shaft 48. The slotted arm of the lever 59 embraces a pin 60 mounted between the side flanges of the work support slide. The rearwardly extending arm of the lever 59 carries a pin 62 to which is connected one end of a coil spring 64 stretched between the pin and a pin 66 at the inside of the machine frame. The spring 64 acts through the lever 59 to raise the work support at the desired times during each sewing cycle or to yield when the work support is depressed by irregularities in the thickness of the work. To secure the shoe in firmly clamped position at other times during each sewing cycle, the work support is locked against movement within its guideway.

The work support lock consists of a rectangular bar 68 having a C-shaped enlargement 70 at its upper end, the opening in which surrounds the pin 62 which in turn projects from the lever 59. The bar 68 is slidingly mounted within a lock box 72 formed in part by an inwardly projecting portion of the machine frame and in part by spacing blocks 74, 76 and a cover plate 78 clamped together by screws 80 (see Fig. 9). The spacing block 76 is recessed along its inner surface to receive a series of rolls 82, alternate ones of which engage the rectangular bar 68. The rolls 82 are forced with a locking pressure against the bar 68 yieldingly through engagement of the lowermost roll with a curved finger on a cam lever 84 rotatable about a stud 86 passing through the cover plate 78 and into the inwardly projecting portion of the frame. A downwardly extending arm of the lever 84 is perforated to receive one end of a tension spring 88, the other end of which is hooked within a perforation at the lower end of the spacing block 74. To unlock the work support against the action of the spring 88, a forwardly extending arm of the cam lever 84 carries a roll 90 engaging the periphery of a cam 91 on the sewing shaft at the right of the cam 56. The cam 91 has two undercut portions 92 cooperating with the roll 90 (see Figs. 6, 7 and 10). Between the undercut portions of the cam 91 the roll 90 is raised to unlock the work support, once while the shoe is being fed and once while the cam shaft rotates past a position where the machine is normally brought to rest at the end of a seam. The latter unlocking position of the cam 91 does not interfere with the proper sewing operations of the machine and provides a convenient manner of unlocking the work support for release of a shoe after sewing or for the introduction of a new shoe in starting a new seam.

The lasting finger 26 acts alternately with the presser foot to clamp the shoe against the work support, and remains in engagement with the shoe during work feed, moving with the shoe in the direction of feed. During work feed, the presser foot is disengaged from the shoe and the work support is unlocked so as to engage the shoe with a yielding pressure only (Fig. 31), the lasting finger holding the shoe down against the yielding pressure of the work support.

The mechanism for actuating the lasting finger 26 includes a hook-shaped lever forming the lasting finger and having an integral stud 94 projecting horizontally from its left side as illustrated in Figs. 7 and 29. The stud 94 rotates in a sleeve bearing portion of a feed lever 96 arranged for movement back and forth in the direction of work feed. To actuate the lasting finger toward and from the shoe, a rearwardly extending arm of the lasting finger lever is provided with a stud 98 having a spherical head surrounded by a socket in a link 100, the lower end of which has a similar socket surrounding the head of a stud 102 secured to the outer end of a cam lever 104 fulcrumed on a horizontal shaft 106. The lasting finger cam lever 104 has a roll 108 engaging a suitably shaped slot in the left side of the cam 91.

The stitch forming devices of the machine are of relatively simple construction and are particularly effective for the operations intended to be performed. These devices include a work-feeding curved hook needle 110, a stationary looper or guide 112, a thread finger 114, and a take-up 116. The thread is drawn from a supply by the stitch-forming devices through a wax pot 118 secured to a bracket 119 at the lower front side of the sewing head of the machine past a frictional tension wheel 120 directly above the wax pot, over a pulley 122 rotatable on a fixed bracket and downwardly about a pulley 124 carried by the take-up 116. From the take-up pulley 124, the thread is drawn directly through the looper to the thread finger.

The needle 110 is clamped within a segment 126, the hub of which is rotatable on the sleeve portion of the feed lever 96, the parts being retained in proper relationship by a nut 128 threaded on the left end of the stud 94. The mechanism for actuating the needle to penetrate and withdraw from the work includes a link 130 universally connecting the segment 126 to one end of a floating lever 132, the other end of which is forked and has a bearing on a sleeve 134 (see Figs. 20 and 21) clamped between rearwardly extending lugs on the shank of the work support 22 by a bolt 136 passing through the perforations in the lugs and the sleeve 134. Between the ends of the floating lever 132 is an actuating link 138 pivotally connected to the floating lever and to the forward end of a cam lever 140 rotatable on the fulcrum shaft 48. The rearward end of the lever 140 has a cam roll 142 engaging a slot in the right side of the cam 56. By these connections, the needle is actuated to penetrate the shoe, to receive a loop of thread from the looper and thread finger and to retract with the thread from the shoe a uniform distance measured from the work-engaging surface of the work support regardless of the position of the work support or the thickness of the work. This result is obtained by the manner of connecting the floating lever 132 to the work support.

The needle actuating connections are such that, when the work support is raised, as with shoes having relatively thin soles (Figs. 15 and 16), the needle is actuated to a higher position than when the work support is lowered as with shoes having thick soles (Figs. 20 and 24). By so doing, the amount of thread required by the needle in completing its stroke is always the same and the needle always moves into a fixed relationship with the work support during its work penetrating stroke, enabling the use of a looper and thread finger mounted upon the work support.

The looper comprises a stationary thread guide 112 formed by a perforated pin fixed to the work support within its open frame portion. The sewing thread, indicated at 144, passes from the take-up through the perforation in the guide 112 to the thread finger. The perforation in the looper is so located that as the needle penetrates the shoe, the hooked end of the needle passes downwardly on the right side of the thread stretched between the looper and thread finger to a position with its hook always below the level of the thread. During feeding movement of the shoe, the needle moves to the left, engaging the thread stretched between the looper and the thread finger, as illustrated in Figs. 19 and 23, in such manner that, during the retracting stroke of the needle, the thread slides within the needle hook. During the continued retracting movement of the needle the threaded hook enters the work and the thread finger is actuated to give up thread to the needle.

To actuate the thread finger 114, it is pivotally mounted on the sleeve 134 (Figs. 20 and 21) secured within the work support between the separated hub portions of the floating needle actuating lever 132, best shown in Fig. 10. The thread finger has a segmental portion formed with an arcuate tongue and groove connection with a similar portion on an arm 146. The two segmental portions of the thread finger and arm 146 are clamped together by a screw 148 passing through a slot in the arm 146 and into threaded engagement with the thread finger. The lower end of the arm 146 is connected by a link 150 to the upper arm of the cam lever 50 which actuates the presser foot. Thus, a single mechanism is provided to actuate both the presser foot and thread finger, the presser foot being raised when the thread finger draws the thread rearwardly away from the looper to enable it to be laid in the needle hook. The arrangement of the lever 50 and the arm 146 brings their points of pivotal connection with the link 150 into approximate horizontal alinement. As the work support carrying the fulcrum sleeve for the thread finger moves up and down during sewing operations, this up and down movement causes substantially no movement to be imparted to the thread finger relatively to the work support.

The mechanism for actuating the take-up 116 comprises an arm forming the take-up rotatable on the shaft 52 and having a toothed segment 152 on its hub meshing with a similar segment 154 on a cam lever 156. The lever 156 carries a cam roll 158 entering a slot in the right side of the cam 91.

To impart feeding movements to the lasting finger 26 and the needle 110, the feed lever 96 is mounted to swing on a vertical pin 160 secured at its lower end in a transverse portion of the machine frame and provided with an enlarged head at its upper end fitting an opening in the upper portion of the machine frame. The rearwardly curved arm of the lever 96 has clamped to its end a pivot 162 entering loosely at its upper and lower ends within openings in spaced portions of a link 164, the opposite end of which is pivotally connected to a bolt 166 clamped within an arcuate slot of a cam lever 168 (see Fig. 29). The cam lever 168 is mounted to swing on a vertical fulcrum pin 170 fixedly mounted between lugs on the machine frame and carries a cam roll which enters a slot in the peripheral face of the cam 56. The movements of the needle and thread finger imparted by the feeding connections are adjustable by loosening the bolt 166 and shifting its position within the slot of the lever 168, which slot is concentric with the pivot 162 on the rearward arm of the feed lever 96 while the lever is in its fully back-fed position. Thus, any adjustment of the length of feed does not affect the position of the needle before looping but merely changes its extreme forward feeding position. During the time the needle engages the work, the presser foot is actuated to release its clamping pressure on the work so that the work may be fed easily. When the needle is actuated to penetrate and retract from the work, however, the work support is locked.

During the back feeding movement of the needle, the lasting finger 26 moves along in engagement with the upper within the angle formed by the flange on the upper and the last-supported surface of the upper to guide and press the upper within the angle progressively with a preliminary pressure, the parts of the shoe being clamped together by the presser foot and work support at this time and the upward force of the work support providing pressure on the lasting finger. Thereafter the insertion and setting of successive stitches tightens the upper with a lasting tension and fastens it securely within the angle formed by the side of the last and sole 12.

The machine is equipped with a high-speed driving and a low-speed reverse stopping mechanism of compact and relatively simple design arranged conveniently for bringing the machine to rest with the stitch-forming devices in a predetermined relationship free of the work and with the shoe-clamping members released from the shoe so that a new shoe may readily be substituted for a sewn one. The driving and stopping mechanism has high and low-speed driving clutches, the low-speed driving clutch acting, first, as a brake after the high-speed clutch has been disengaged and, finally, after reversing the rotation, bringing the machine to rest in the desired predetermined position. The driving and stopping mechanism is generally similar to that disclosed in United States Letters Patent No. 1,099,326, granted June 9, 1914, upon an application filed in the name of Laurence E. Topham.

The high speed driving mechanism comprises a helical gear 171 secured to the main sewing shaft 58 between the cams 56 and 91, which gear meshes with a similar gear 172 secured to a driving shaft 173 mounted in a horizontal position with friction reducing bearings in the machine frame beneath the sewing shaft 58. Rotatable on the reduced outer portion of the driving shaft 173 is a double pulley clutch member 174 having a cone-shaped recess at one end cooperating with a driven clutch member 176 (see Fig. 11). To engage and disengage the driven clutch member 176 with the driving pulley 174, the hub of the clutch member carries a clutch collar 178 having diametrically alined pins 180 projecting from its periphery engaged by a yoke 182 surrounding the collar and clamped to a shaft 184 rotatably mounted in a fixed bracket 186. To the left end of the shaft 184 is clamped a cam arm 188 cooperating with a roll 190 on a control lever 192, best shown in Figs. 25 and 26. A downwardly extending arm of the lever 192 is formed with a projection entering a notch in an arm of a treadle-actuated bell-crank lever 194 having a pivot 196 formed integrally with the lever and rotatable in a bearing in the base of the machine. The arrangement is such that the head of the machine may readily be removed from the base and the treadle-actuated lever 194 will separate from the control lever 192 without dismantling any of the connections. The treadle lever has a horizontal arm connected to the upper end of a downwardly extending rod 198 secured at its lower end to a clamp 200 (see Figs. 12 and 14) surrounding the rod 198 and a similar rod 202 connected at its lower end to a treadle 204. The treadle 204 projects from the front of the machine base and is pivotally mounted on a shaft 206 at the rear of the base. By these connections, the machine may be driven and the speed controlled in the usual way by increasing or decreasing the pressure exerted on the treadle 204. Upon release of the treadle, the treadle rods are raised by a spring 208 and the control lever 192 is rocked in a direction to throw out of operation the high-speed clutch and set in operation the low-speed stopping mechanism.

The control lever 192 is secured to a horizontal rockshaft 210 rotatable in a bearing passing through the side wall of the machine frame, and the hub of the lever has a cam-shaped enlargement arranged to engage a roll 212 during normal sewing operations. The roll 212 is rotatably supported on a locking pin releasing lever 214 the forked end of which surrounds a locking pin 216 and engages a check nut 218 at the lower end of the pin to retract the pin from engagement with a vibrating lever 220 (Figs. 7 to 10). The locking pin is slidably mounted in a yieldingly mounted carrier 222 and is urged upwardly toward engagement with the vibrating lever by a spring 224 coiled about a reduced portion of the locking pin within a recess in the carrier 222 (see Fig. 26). As soon as the treadle-actuated connections are raised by the spring 208, the locking pin is allowed to rise and engage the vibrating lever to restrain its movements and to cause a roll 225 on an arm of the lever to actuate a low-speed driven clutch member 226 (see Fig. 7) on the sewing shaft against the force of a low-speed clutch-opening spring 228 tending to separate the clutch member from its driver 230. Forcing the two low-speed clutch members together reduces the speed of the sewing shaft 58 and drives the sewing shaft through a predetermined angular distance until a cam slot 232 on the driven clutch member which is engaged by the roll 225 reaches a predetermined position. Being driven at a relatively low speed, the shaft 58 together with its cams loses most of its momentum and, as soon as the cam slot 232 causes the low-speed clutch members again to separate, the shaft immediately comes to rest. To prevent overthrow of the sewing shaft past the desired stopping position, the rockshaft 210 has rotatable on it inside the machine a hooked arm 234, the hooked end of which engages a shoulder 236 (Fig. 11) on the cam 56 in stopped position of the sewing shaft. To move the hooked arm away from the cam during sewing operations, the rockshaft 210 has clamped to it an oil pump actuating lever 238 provided with an arm engaging the under side of the hooked arm 234, pressing it away from the cam 144 when the high-speed clutch is engaged. To move the hooked arm against the cam 144 as the machine is brought to rest, the rearward side of the arm is engaged by a coil spring 240 compressed between the arm and the inner surface of the machine frame.

For driving the double pulley member 174, the larger pulley thereof is surrounded by a belt 242, best shown in Fig. 3, engaging a pulley 244 of a motor 246 carried by the lower part of the machine frame. The double pulley member 174 is rotated continuously and a second belt 248 surrounding the smaller pulley of said member engages a pulley 250 on a low-speed driving shaft 252, best shown in Fig. 7. The low-speed driving shaft is rotatable in bearings arranged at right angles to the sewing shaft 58 and carries a worm gear 254 meshing with helical teeth formed around the periphery of the low-speed driver 230.

To assist in removing or applying a shoe to the machine, convenient means is provided for lowering the work support 22 from engagement with the shoe. The lower end of the work support slide has pivotally connected to it a link 256 also pivotally connected to a spring-pressed knee lever 258 mounted on a hinge pin 260 secured to the upper portion of the wax pot bracket 119. The knee lever 258 is disposed in such position that the operator may employ the same leg to operate both the foot treadle and the knee lever.

The tension wheel, as best illustrated in Fig. 5, comprises a rotatable toothed disk 262 about the circumference of which the thread is wrapped. The disk is rotatable on a flange sleeve 264 and is engaged at either side by a friction washer 266. The flange sleeve 264 is slidable within an opening in a bushing 268 within the central passage of which is mounted a coil spring 270 acting to compress a flange on the bushing 268 against the friction washers 266 engaging the tension wheel. To provide convenient hand adjustment for the force of the spring 270, the inner end of the spring engages a nut 272 threadedly receiving an adjusting screw 274 having a knurled head acting against the flanged sleeve 264. To prevent rotation of the nut 272 with the adjusting screw 274, a radial pin 276 is inserted in one side of the nut to slide with the movement of the nut in a slot in the bushing 268, the bushing 268 being clamped within an opening in the machine frame by a setscrew 278. By loosening the setscrew 278 the tension wheel may be removed or replaced conveniently.

To release the tension wheel from the force of the spring on the friction washers 266 at the end of a seam so that the thread may be drawn readily past the tension wheel, the bushing 268 carries a transverse pin 280 supporting a forked lever 282 having an angular portion engaging the inner end of the adjusting screw 274 and its forked portion surrounding a tension releasing rod 284 having check nuts 286, best shown in Fig. 6, for operating the lever. The rod 284 extends across the inner end of the bushing and passes loosely through an opening in the machine frame and is pivotally connected to the oil pump actuating lever 238. When the machine is brought to rest, the lever 238 is moved rearwardly, causing the tension to be released and, when the machine is started, forward movement of the lever causes the tension to be reapplied. The arrangement of the forked lever and the tension releasing rod enables the bushing carrying the lever, the tension wheel and friction washers to be removed from the frame as a unit, the forked portion of the lever readily separating from the releasing rod.

The operation of the work-clamping and stitch-forming devices during sewing operations will be readily apparent from the time chart of Fig. 31. The needle, being the instrument employed for feeding the work, acts between the presser foot and the lasting finger so that it engages the upper of a shoe within the angle between the bulging and the outturned portions thereof which are secured in position by the clamping action of the work support and lasting finger. In penetrating the upper it forces the upper into the angle of the last and sole. During each feeding movement of the needle, the lasting finger moves with it so that no displacement of the upper from proper lasted position is possible at this time. The work support is unlocked during the feeding movement of the shoe, and the presser foot is raised from engagement with the upper, the lasting finger only serving to hold the upper in place within the angle of the last and sole. By utilizing the feeding movement of the needle to assist in laying the thread in the needle hook, no time is lost while the needle engages the work for the looping operation, the needle being retracted from the work immediately at the end of the feeding movement.

Referring to Figs. 1, 3, 12, 13 and 14, the sewing head frame of the machine is indicated at 288 and is supported on a rigid cast metal floor mounting base 290 within which the treadle 204 is fulcrumed and from which it projects toward the front of the machine.

The structure for supporting the sewing head frame 288 on the base 290 is particularly advantageous for the purpose intended and presents a comparatively smooth unbroken external contour while at the same time enabling easy and effective height adjustment of the machine without the use of especially constructed expensive parts, the assembly of which is difficult or inconvenient. The structure is fabricated to combine the best qualities of castings and enclosing sheet metal while maintaining an arrangement providing lightness together with maximum rigidity. Besides providing space inside the structure for height adjusting devices so that no unsightly protuberances appear on the external surfaces, other parts also may be enclosed by the structure including the treadle and driving connections of the machine, thus guarding against accidental contact with moving machine parts.

The fabricated machine supporting structure comprises an external weight supporting and enclosing frame consisting of a hollow sheet-metal column 292 bent into a rectangular form with rounded corners and spaced vertical edges at the rearward side of the structure, giving a cross-sectional shape resembling generally the letter C. The sheet-metal material of the hollow column has good weight supporting characteristics but, for torsional resistance along its heightwise axis, particularly in resisting strains set up during shipment of the machine, reinforcement of the column is desirable. For this purpose, the upper end of the column has mounted on it a flanged plate 294 (Figs. 12 and 13) to which is secured a vertical cylindrical cast metal sleeve 296 substantially smaller internally than the internal cross-sectional area of the column. The sleeve is arranged vertically nearer to the front edge of the plate 294 and within the sleeve is disposed a hollow rigid post 298 fitting the sleeve for vertical sliding movement and passing loosely through a second bearing sleeve 300 formed integrally with the base 290. The hollow post 298 forms a backbone for the supporting structure not only to give the structure torsional strength but also to prevent the column from swaying on the base.

To retain the post 298 adjustably in fixed position in the sleeve 296, the rearward side of the post is slotted at 301, and a downwardly extending rim of the sleeve 296 carries a clamping bolt 302 having its head inside the post and its shank passing through the slot 301. By tightening the nut on the clamp bolt 302, the post is secured against vertical movement in the sleeve. For use while the machine is being shipped from one factory to another, means similar to the bolt 302 may be employed to clamp the sleeve 300 in the base to the post 298.

To adjust the height of the machine vertically, the clamping means including the bolt 302 is loosened and a vertically arranged jack screw 303 is rotated. The jack screw 303 is threadedly received within the bearing sleeve 296 and engages at its upper end a sewing head mounting support 304 in the upper end of the post 298. The lower end of the jack screw 303 is squared to receive a wrench and is accessible together with the nut on the clamp bolt 302 through the opening provided between the spaced vertical edges of the column 292.

For mounting the driving motor 246, the post 298 carries along its central portion a second support in the form of a bracket 305 within the column having a sleeve portion surrounding the post and a laterally projecting portion to which is clamped a motor support bracket 306. The laterally projecting portion of the bracket 305 and the motor support bracket 306 together form a projection extending outside between the vertical edges of the column in a manner to form a particularly rugged construction with the full weight of the operating parts both in the machine head and the driving motor bracket supported by the post 298. The entire weight of the operating parts in the machine is borne in turn by the sheet metal column 292 in the form of compression only, no substantial lateral strains being applied to the column or concentrated along its sides where its relatively thin gage would render it subject to deflection.

The supporting structure of the machine provides a quick acting speed adjustment of the driving connections between the motor and the sewing head of the machine, both said adjustment parts and the driving connections being enclosed by the column. For this purpose, the motor pulley 244 (Fig. 3) is of the variable-speed type in which two opposed conical flanges are pressed yieldingly together against the inclined sides of the belt 242 having the usual V-section. This pulley, accordingly, enables the belt to cause separation of the flanges and to move inwardly toward the central axis of the pulley as the belt is tightened, thus reducing the effective diameter of the pulley and reducing the speed of the sewing shaft accordingly. When the belt is loosened, the opposite action takes place, the belt moving outwardly along the conical flanges of the pulley 244.

To tighten or loosen the belt 242 and thus to change the speed of the main sewing shaft 58, the bracket 305 is slidingly mounted on the post 298. To slide the bracket on the post the bracket receives a vertical threaded rod 308, the upper end of which has an enlarged lug through which passes a pin 310 secured diametrically to the post 298. The threaded rod 308 is surrounded at its lower end with an internally threaded helical gear 312 disposed within a side opening of the bracket 305. Meshing with the teeth on the gear 312 is a corresponding gear 314 of somewhat smaller diameter secured on a horizontal adjusting shaft 316 rotatable in bearings formed by the bracket 305 and arranged to project through vertical slots in the post and a corresponding slot in the forward side of the column 292. On the forward end of the adjusting shaft 316 is a hand wheel 318, rotation of which causes the helical gear 312 to rotate and raise or lower the bracket 305 on the post 298, increasing or reducing the distance between the bracket and the head support 304. Movement of the bracket on the post tightens or loosens the belt 242 in the desired manner without changing the overall height of the machine. Due to the arrangement of the motor support bracket on the post, height-adjusting movement of the post to raise and lower the sewing head of the machine does not change the sewing speed of the machine or affect the driving connections in any way.

To impart a finished and pleasing appearance to the machine-supporting structure, the flanged support 304 has secured to its under surface an apron 320 provided with downwardly extending sides fitting closely with the outer surfaces of the column 292. When the height of the machine on the column is changed, the apron 320 moves with the sewing head but the downwardly extending sides of the apron are of sufficient length to overlap the column in all positions of the sewing head.

While the illustrated frame structure is of particular advantage for use with a sewing or other shoe machine in which it is desired to adjust the height to accommodate the convenience of the operator of the machine, certain features of the structure are useful where no height adjustment is required.

Certain features of the invention herein disclosed form the subject matter of a divisional application, Ser. No. 92,407, filed May 10, 1949, relating to a machine supporting structure, speed adjustment and driving connections therefor.

The nature and scope of the invention having been indicated and a specific embodiment having been described, what is claimed is:

1. A stitchdown thread lasting machine having clamping members comprising a presser foot and a lasting finger acting to secure the outturned upper and extension sole of a stitchdown shoe in lasted relation, in combination with stitch-forming devices including a curved hook needle acting between the presser foot and lasting finger to penetrate the upper within the angle between the bulging and outturned portions thereof.

2. A stitchdown thread lasting machine having clamping members acting to secure the outturned upper and extension sole of a stitchdown shoe in lasted relation, in combination with stitch-forming and work-feeding devices including a curved hook needle arranged to insert a chain-stitch seam connecting the outturned upper and sole while secured by the clamping members and to move with the work during work feed.

3. A stitchdown thread lasting machine having clamping members comprising a presser foot and a lasting finger acting to secure the outturned upper and extension sole of a stitchdown shoe in lasted relation, in combination with stitch forming devices including a curved hook needle acting between the presser foot and lasting finger to penetrate the upper within the angle between the bulging and outturned portions thereof, and mechanism for actuating the needle and lasting finger together along the line of the seam during work feed while the needle is engaging the work.

4. A stitchdown thread lasting machine having clamping members comprising a presser foot and a lasting finger acting to secure the outturned upper and extension sole of a stitchdown shoe in lasted relation, in combination with stitch-forming devices including a curved hook needle acting between the presser foot and lasting finger to penetrate the upper within the angle between the bulging and outturned portions thereof, and mechanisms for actuating the presser foot to release the work while the needle engages the work and to move the needle and lasting finger together along the line of the seam during work feed.

5. A stitchdown thread lasting machine having work-clamping members comprising a work support pressed yieldingly toward others of the clamping members to secure the outturned upper and extension sole of a stitchdown shoe in lasted relationship, in combination with stitch-forming devices arranged to insert a chain-stitch seam connecting the outturned upper and sole while secured by the clamping members, and mechanism for locking and unlocking the work support during each sewing cycle.

6. A stitchdown thread lasting machine having work-clamping members comprising a work support pressed yieldingly toward others of the clamping members to secure the outturned upper and extension sole of a stitchdown shoe in lasted relationship, in combination with stitch-forming devices arranged to insert a chain-stitch seam connecting the outturned upper and sole while secured by the clamping members, and mechanism connected with the work support for actuating the needle to vary the movements of the needle with changes in thickness of the work between the work-clamping members.

7. A stitchdown thread lasting machine having work-clamping members comprising a work support pressed yieldingly toward others of the clamping members to secure the outturned upper and extension sole of a stitchdown shoe in lasted relationship, in combination with stitch-forming devices arranged to insert a chain-stitch seam connecting the outturned upper and sole while secured by the clamping members, and mechanism connected with the work support for actuating the needle to a lower position as it is retracted from thick work and to a higher position during its retracting stroke with thin work.

8. A stitchdown thread lasting machine having clamping members one of which is pressed yieldingly toward the others to secure the outturned upper and extension sole of a stitch-down shoe in lasted relation, in combination with stitch-forming devices including a hook needle and looping means mounted on the yieldingly pressed clamping member arranged to insert a chain-stitch seam to connect the outturned upper and sole while secured by the clamping members, and mechanism connected with the yieldingly pressed clamping member for actuating the needle to vary its movements with changes in thickness of the work between the clamping members.

9. A stitchdown thread lasting machine having work-clamping members one of which is pressed yieldingly toward the others to secure the outturned upper and extension sole of a stitchdown shoe in lasted relation, in combination with stitch-forming devices including a hook needle and a looper and a thread finger mounted on the yieldingly pressed clamping member arranged to insert a chain-stitch seam to connect the outturned upper and sole while secured by the clamping members, mechanism connected with the yieldingly pressed clamping member for actuating the needle to vary its movements with changes in thickness of the work between the work-clamping members, and mechanism for actuating the thread finger to draw a length of thread between the needle and the last-formed stitch in the work during each sewing cycle and to assist in laying the thread in the hook of the needle.

10. A stitchdown thread lasting machine having clamping members, comprising a yieldingly pressed work support, and a presser foot arranged to oscillate toward and from the work support, in combination with stitch-forming and work-feeding devices including a hook needle arranged to penetrate and retract from the work and to move with the work during work feed, a looper and a thread finger on the work support, mechanism for actuating the thread finger to hold a length of thread in the path of movement of the needle at a position in alinement with the needle hook during work feed, and mechanism connected with the work support for actuating the needle toward and from the work to bring the hook of the needle into uniform relationship with the thread finger as the thickness of the work changes.

11. A stitchdown thread lasting machine having clamping members, comprising a yieldingly pressed work support, and a presser foot arranged to oscillate toward and from the work support, in combination with stitch forming and work feeding devices including a hook needle arranged to penetrate and retract from the work and to move with the work during work feed, a looper fixed to the work support, a thread finger movable on the work support to draw a length of thread from the looper across the path of movement of the needle to a position in alinement with the needle hook during work feed, and mechanism for actuating the thread finger to give up thread to the needle when the threaded needle hook enters the work.

12. A sewing machine having a hook needle, a sewing cam shaft, and work clamping members comprising a presser foot at the same side of the work with the needle, and a work support mounted for movement toward and from the presser foot, in combination with needle actuating mechanism the connections of which comprise a floating lever having one point thereon pivotally connected to the work support and another point pivotally connected to the needle, and a cam lever actuated by the sewing shaft and pivotally connected to a third point on the floating lever.

13. A sewing machine having a hook needle, a sewing cam shaft, clamping members comprising a presser foot at the same side of the work with the needle, a work support slidingly mounted for movement toward and from the presser foot, and means for yieldingly pressing the work support toward the presser foot, in combination with needle actuating mechanism the connections of which comprise a floating lever having one point thereon pivotally connected to the work support and another point pivotally connected to the needle, a cam lever actuated by the sewing shaft and pivotally connected to a third point on the floating lever, and a lock for securing the work support against movement during actuation of the cam lever.

14. A sewing machine having a hook needle, a sewing cam shaft, clamping members comprising a presser foot at the same side of the work with the needle, a work support slidingly mounted for movement toward and from the presser foot, and means for yieldingly pressing the work support toward the presser foot, in combination with needle actuating mechanism the connections of which comprise a floating lever pivotally connected at one point thereon to the needle, a pivot for the floating lever on the work support at another point, a cam lever actuated by the sewing shaft and pivotally connected to a third point on the floating lever, and a thread finger mounted on said pivot for the floating lever on the work support in a position to assist in laying a sewing thread within the needle hook.

15. A stitchdown thread lasting machine having stitch forming devices including a curved hook needle, a sewing shaft and work clamping members comprising a work support and a lasting finger acting to secure the outturned upper within the angle between a last and the extension sole of a stitchdown shoe in advance of the point of needle operation, in combination with a carrier for the needle movable along the line of feed on which the lasting finger is fulcrumed concentrically with the needle.

16. A stitchdown thread lasting machine having stitch-forming devices including a curved hook needle, a sewing shaft and work-clamping members comprising a work support and a lasting finger acting to secure the outturned upper within the angle between a last and the extension sole of a stitchdown shoe in advance of the point of needle operation, in combination with a carrier for the needle movable along the line of feed on which the lasting finger is fulcrumed concentrically with the needle, and mechanisms operated by the sewing shaft for actuating the needle and wiping finger.

17. A stitchdown thread lasting machine having stitch-forming devices including a curved hook needle, a sewing shaft and work clamping members comprising a work support and a lasting finger acting to secure the outturned upper within the angle between a last and the extension sole of a stitchdown shoe in advance of the point of needle operation, in combination with a carrier lever mounted to swing at one end along the line of work feed, a stud on the carrier lever about which the needle and lasting finger oscillate, and a presser foot acting to clamp the work against the work support while the needle and lasting finger are being back fed.

18. A sewing machine having a hook needle, needle looping devices including a thread finger, a work support, and a presser foot for clamping the work against the work support, in combination with a single mechanism for actuating the presser foot and thread finger.

19. A sewing machine having a hook needle, needle looping devices including a thread finger, a yielding work support on which the thread finger is mounted, a presser foot for clamping the work against the work support, and a sewing shaft, in combination with a single mechanism driven by the sewing shaft connecting the thread finger and presser foot to move the thread finger into a position to enable the thread to be laid in the hook of the needle and simultaneously to raise the presser foot.

20. A sewing machine having a work-feeding hook needle, needle-looping devices including a thread finger and a looper, a movable work support on which the thread finger and looper are mounted, a presser foot, means for guiding the work support and presser foot for movement toward and from each other, and a sewing shaft, in combination with a single mechanism driven from the sewing shaft for actuating the presser foot to clamp and release the work on the work support and simultaneously for moving the thread finger away from the looper on the work support to carry the thread into a position in which it will enter the hook of the needle during work feed, and other mechanism for locking the work support against movement during the work penetrating and retracting strokes of the needle.

21. A sewing machine having a work-feeding hook needle, needle-looping devices including a thread finger and a looper, a movable work support on which the thread finger and looper are mounted, a presser foot, means for guiding the work support and presser foot for movement toward and from each other, and a sewing shaft, in combination with a single mechanism driven from the sewing shaft for actuating the presser foot to clamp and release the work on the work support and simultaneously for moving the thread finger away from the looper on the work support to carry the thread into a position in which it will enter the hook of the needle during work feed, other mechanism for locking the work support against movement during the work penetrating and retracting strokes of the needle, and a work-engaging finger separate from the presser foot for guiding the work while the presser foot is moved out of clamping position and the work support is unlocked.

22. A stitchdown thread lasting machine having stitch-forming and work-feeding devices including a hook needle, a presser foot arranged to oscillate through a fixed path toward and from the shoe, a work support pressed yieldingly toward the presser foot to clamp the shoe, and mechanism for locking the work support from movement during the penetrating and retracting strokes of the needle and for unlocking the work support for yielding movement during relative work-feeding movement between the shoe and the work support, in combination with a work-engaging finger toward which the yielding work support is pressed to position the shoe during its relative feeding movement.

23. A stitchdown thread lasting machine having stitch-forming and work-feeding devices including a hook needle, a presser foot arranged to oscillate through a fixed path toward and from the shoe, a work support pressed yieldingly toward the presser foot to clamp the shoe, and mechanism for locking the work support from movement during the penetrating and retracting strokes of the needle and for unlocking the work support for yielding movement during relative work feeding movement between the shoe and the work support, in combination with a work-engaging finger toward which the yielding work support is pressed to position the shoe during its relative feeding movement, and mechanism for retracting said finger during certain portions of each sewing cycle.

24. A stitchdown thread lasting machine having stitch-forming and work-feeding devices including a hook needle, a presser foot arranged to oscillate through a fixed path toward and from the shoe, a work support pressed yieldingly toward the presser foot to clamp the shoe, and mechanism for locking the work support from movement during the penetrating and retracting strokes of the needle and for unlocking the work support for yielding movement during relative work-feeding movement between the shoe and the work support, in combination with a work-engaging finger toward which the yielding work support is pressed to position the shoe during its relative feeding movement, and mechanisms for actuating both the presser foot and work-engaging finger toward and from the shoe while maintaining said members alternately in engagement with the shoe throughout each sewing cycle.

25. A stitchdown thread lasting machine having stitch forming devices including a curved needle arranged to insert a chain-stitch seam connecting the outturned upper and sole of a stitchdown shoe, in combination with clamping members comprising an upper engaging presser foot and a sole engaging work support having its sole engaging surface projecting substantially beyond the upper engaging surface of the presser foot and having a general inclination to the path of the needle along that portion engaging the work to insert the through-and-through lengths of thread in the seam in a relation inclined with respect to the bottom of the sole and curved outwardly within the substance of the sole with the chain of the seam engaging the shoe upper.

26. A stitchdown thread lasting machine having stitch forming devices including a curved hook needle for inserting a chain-stitch seam connecting the outturned upper and sole of a stitchdown shoe, in combination with clamping members comprising an upper engaging presser foot and a sole engaging work support having its sole engaging surface projecting substantially beyond the upper engaging surface of the presser foot and having an inclination upwardly from the front of the machine toward the rear to support the shoe in a position in which the needle acts during its work penetrating stroke first to engage the upper within the angle between the bulging and outturned portions thereof.

RUTH W. MORRILL,
*Administratrix of the Estate of Alfred R. Morrill, Deceased.*

REFERENCES CITED

The following references are of record in the file of this patent:

UNITED STATES PATENTS

| Number | Name | Date |
| --- | --- | --- |
| 48,614 | Ballou | July 4, 1865 |
| 287,928 | Heberling et al. | Nov. 6, 1883 |
| 319,850 | Richardson | June 9, 1885 |
| 352,752 | Hooker | Nov. 16, 1886 |
| 1,264,284 | Denne | Apr. 30, 1918 |
| 1,418,655 | Klemmer | June 6, 1922 |
| 1,677,343 | Howlett | July 17, 1928 |
| 1,681,623 | Pentler et al. | Aug. 21, 1928 |
| 1,844,730 | Whelton | Feb. 9, 1932 |
| 1,864,510 | Leveque | June 21, 1932 |
| 1,920,338 | Ayers | Aug. 1, 1933 |
| 2,132,797 | Mousset | Oct. 11, 1938 |
| 2,237,403 | Bedford et al. | Apr. 8, 1941 |